United States Patent [19]

Parkyn et al.

[11] Patent Number: 4,520,795
[45] Date of Patent: Jun. 4, 1985

[54] SOLAR COLLECTOR HAVING TANK AND GLAZING CONSTRUCTION

[76] Inventors: William A. Parkyn; Horace W. Ladd; Andrew M. Mellon, all of 1424 W. 259th St., Harbor City, Calif. 90710

[21] Appl. No.: 559,051

[22] Filed: Dec. 9, 1983

[51] Int. Cl.³ .................................................. F24J 3/02
[52] U.S. Cl. ...................................... 126/443; 126/437
[58] Field of Search .......................... 126/443, 437, 438

[56] References Cited

U.S. PATENT DOCUMENTS

| 5,665 | 11/1879 | Tibor . | |
|---|---|---|---|
| 603,317 | 5/1898 | Calver . | |
| 629,122 | 1/1899 | Davis . | |
| 735,331 | 8/1903 | Walker . | |
| 2,167,576 | 7/1939 | Kiser . | |
| 2,213,894 | 9/1940 | Barry . | |
| 2,247,830 | 7/1941 | Abbot | 126/443 |
| 3,987,781 | 10/1976 | Nozik et al. | 126/443 |
| 4,048,982 | 9/1977 | Pei | 126/442 |
| 4,081,289 | 3/1978 | Campbell | 126/443 |
| 4,119,085 | 10/1978 | Knowles et al. | 126/433 |
| 4,124,019 | 11/1978 | Heffelfinger | 126/443 |
| 4,134,388 | 1/1979 | Kersten et al. | 126/443 |
| 4,306,544 | 12/1981 | Clemens | 126/434 |
| 4,416,257 | 11/1983 | Bale | 126/443 |

Primary Examiner—Carroll B. Dority, Jr.
Attorney, Agent, or Firm—William W. Haefliger

[57] ABSTRACT

Apparatus for integral collection and storage of solar thermal energy, comprises
(a) a relatively large storage vessel having side and end walls that absorb solar energy in order to heat its contents;
(b) a translucent enclosure surrounding the large storage vessel, for suppression of convective heat losses;
(c) structure on the vessel for the suppression of thermal radiation heat losses from said large storage vessel;
the apparatus providing a ratio of thermal mass, as measured in BTU per degree Fahrenheit, to heat-loss coefficient, as measured in BTU per degree Fahrenheit per hour, exceeding 36 hours.

24 Claims, 6 Drawing Figures

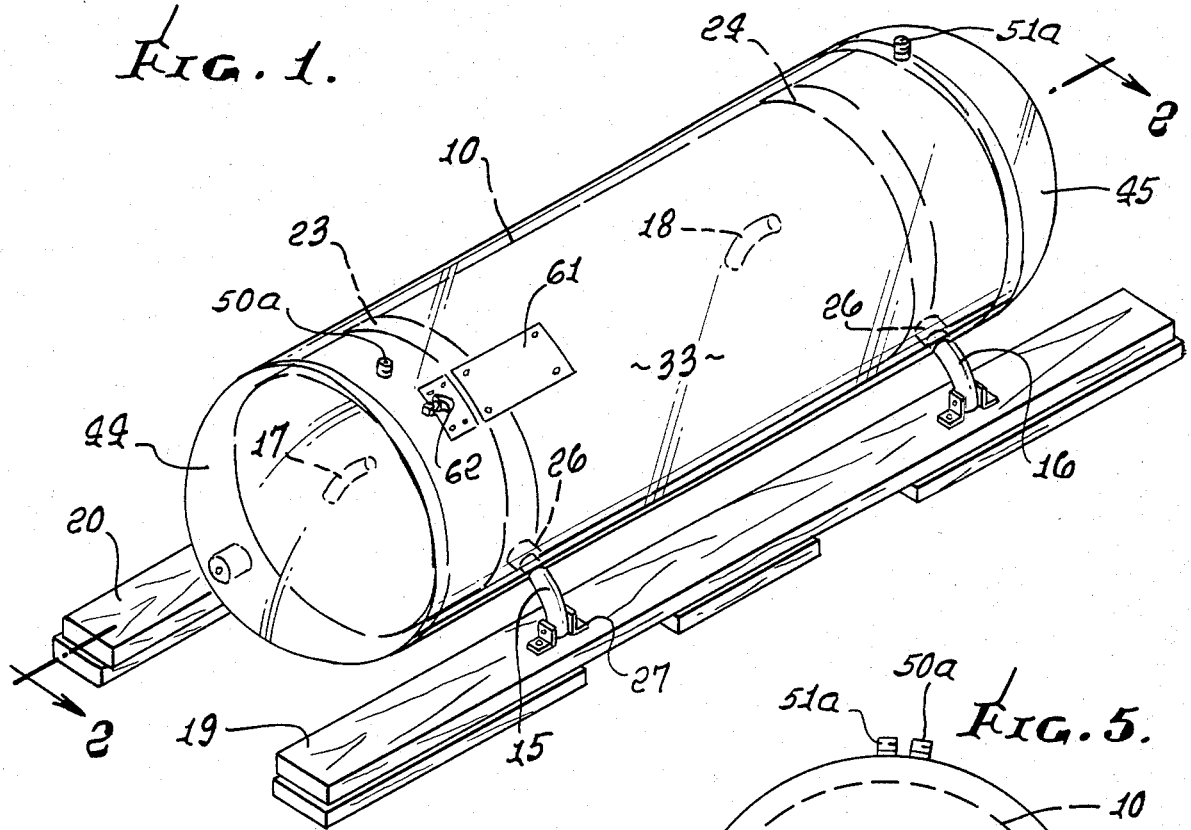
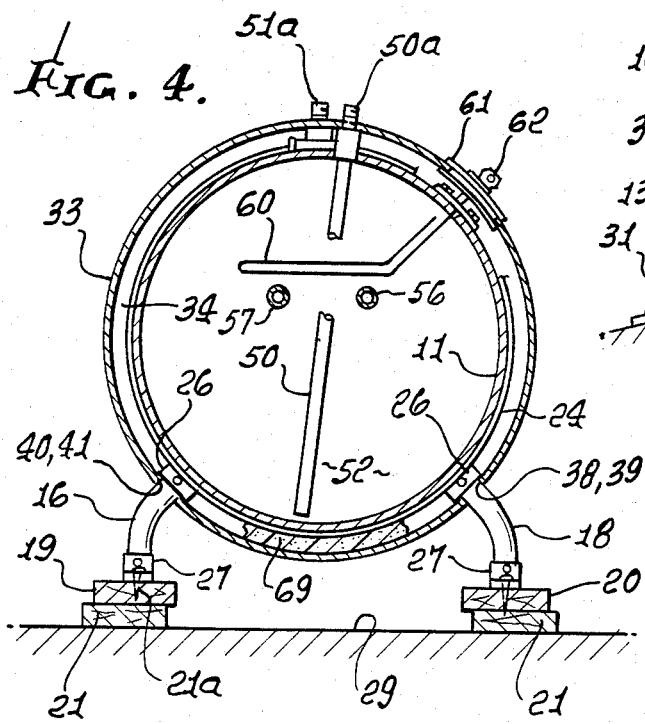
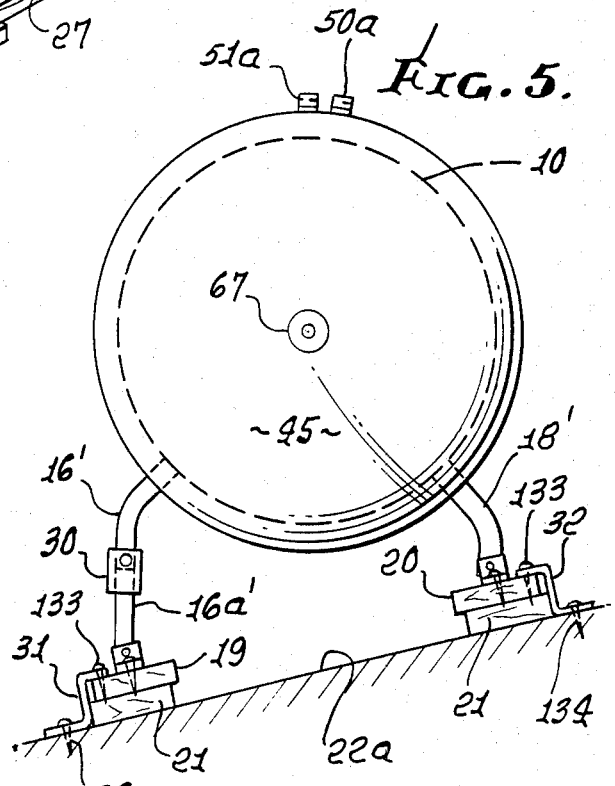
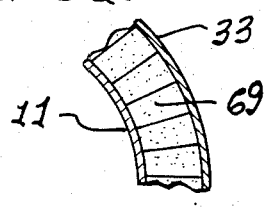

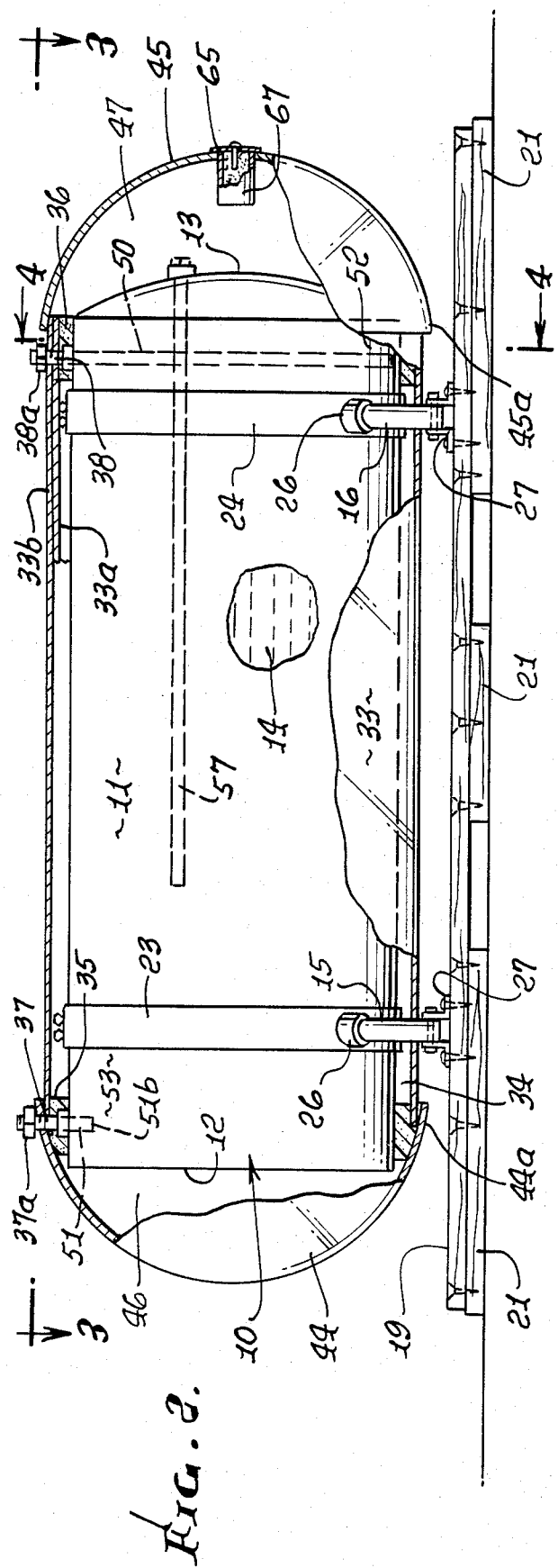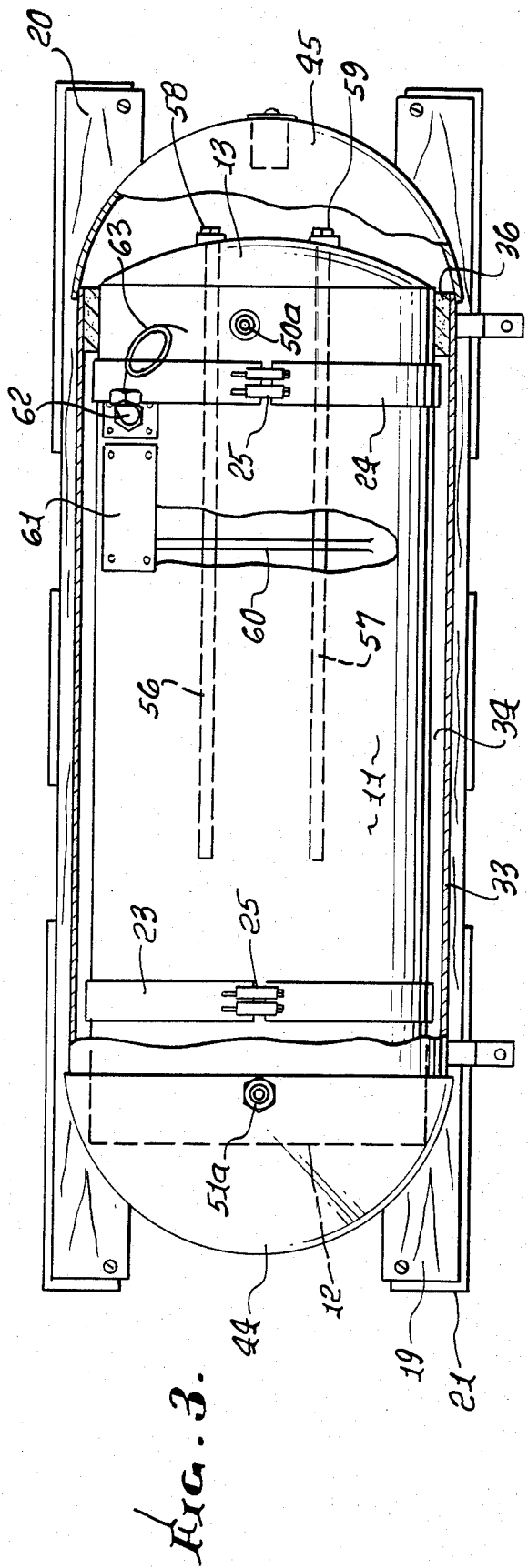

SOLAR COLLECTOR HAVING TANK AND GLAZING CONSTRUCTION

BACKGROUND OF THE INVENTION

This invention relates generally to collection and storage of solar thermal energy. More particularly, it concerns highly effective and improved apparatus for collecting and storing such energy in the form of mass with its temperature elevated above that of its surroundings.

There is clearly a need for compact, easily constructed and efficient apparatus of the above referenced type; in particular, there is a requirement for such apparatus characterized by a high thermal mass in relation to its heat loss coefficient, i.e. BTU per degree Fahrenheit per hour. It is particularly desirable that the apparatus have a construction enabling attainment of such ratios (thermal mass/heat loss coefficient) in excess of 24. It is also desirable that the apparatus be easily transportable to a use site, and then finally assembled as by attachment of translucent shell components to liquid storing tank structure that is sturdily supported by load distributing means, so as to be mounted on roofs, for example. Known prior apparatus did not afford the above advantages or their combination, as in the unusually advantageous structures now made possible by the present invention.

SUMMARY OF THE INVENTION

It is a major object of the invention to provide highly efficient apparatus for collecting and absorbing solar radiant energy, and retention of thermal energy, and characterized by the advantages referred to above. Basically, the apparatus comprises
(a) a metal tank which absorbs solar radiant energy and transfers heat to liquid in the tank, the tank having a side wall and a first end wall,
(b) tank support means including leg structure projecting away from the tank for supporting same, and
(c) translucent glazing shell means supported by the tank and having a side wall extending about and spaced from the tank side wall, the shell means including at least one dome in alignment with said tank end wall and spaced therefrom, said shell means adapted to pass radiant solar energy to impinge on the tank side wall and end wall.

As will be seen, the leg structure may extend from the tank through the shell side wall, and may include multiple legs carried by load distributing skid means, such as two elongated skids which are easily located and supportable on building roof structures. Bands may be extended around the tank to provide connection of the legs to the tank, the bands located in the zone or space between the tank and the surrounding translucent shell.

Further, the shell domes may be attached to the shell side wall ends, to extend at opposite ends of the heavy tank, for optimizing collection of solar radiation thereby providing a "greenhouse" zone of maximum extent, around the tank. (Heat losses are thereby inhibited or suppressed in a simple effective manner.)

These and other objects and advantages of the invention, as well as the details of an illustrative embodiment, will be more fully understood from the following description and drawings, in which:

DRAWING DESCRIPTION

FIG. 1 is a perspective view of solar collector apparatus incorporating the invention;
FIG. 2 is an elevation taken in section on lines 2—2 of FIG. 1;
FIG. 3 is a plan view on lines 3—3 of FIG. 2;
FIG. 4 is a section in elevation on lines 4—4 of FIG. 2;
FIG. 5 is an end view of modified apparatus; and
FIG. 5a is a fragmentary showing of a modified glazing-tank wall assembly.

DETAILED DESCRIPTION

In the drawings, a container or tank 10 is provided to receive liquid (as for example water) to be heated by transfer of heat from the tank wall on which solar radiation impinges. The tank is typically metallic, and has a cylindrical side wall 11 which is longitudinally elongated, and two opposite end walls 12 and 13. Wall 13 may be shallowly outwardly convex, as shown. Liquid in the tank appears at 14.

Tank support means is provided to include leg structure projecting away from the tank wall 11, and in a downward direction or directions. In the example, the leg structure includes multiple legs 15–18 supported by skid means. The latter is shown to include two longitudinally elongated and generally parallel wooden skids 19 and 20. Skid 19 supports legs 15 and 16, and skid 20 supports legs 17 and 18. Wooden blocks 21 are attached as by fasteners 21a to the underside of the skids for attachment to or support on roof structure indicated at 22 in FIG. 4.

The tank support structure also includes band means, such as metallic bands 23 and 24 wrapped or stretched about the tank side wall, band connection being shown at 25. The upper ends of the legs are attached to the bands, as via sockets 26 integral with the bands and receiving the legs. The lower ends of the legs are attached to the skids, as via brackets 27; thus, the legs may be inserted into the sockets and attached to the skids at the job or installation site. Note that legs 16 and 18 of one pair diverge relatively downward, in FIG. 4, as do legs 15 and 17 of the other pair, whereby the skids are sufficiently spaced apart to support the tank even during rocking of the roof, as during an earth quake.

In the modification shown in FIG. 5, the leg 18' is shorter than the overall leg 16' and 16a'; and leg 16a' is an extension coupled at 30 to leg 16'. This better accommodates the support of the tank to the inclined roof 22a, whereby skid 19 is lower and further from the tank 10 than skid 20. Brackets 31 and 32 engage the skids and the roof, and are attached thereto as by fasteners 133 and 134, to further stabilize the installation.

In accordance with a further aspect of the invention translucent glazing shell means is provided to be supported by the tank, and to be installable at the job site. The shell means is adapted to pass radiant solar energy to impinge on the tank side wall, and one or both end walls, for heating those walls which then conduct heat to the liquid in the tank. Such shell means, in the example, includes a shell side wall 33 extending annularly about and spaced from the tank side wall, to provide a trapped air space or zone 34 therebetween, for "greenhouse" heating effect. The shell side wall may comprise a panel or sheet of plastic material (acrylic for example), formed or bent in a circularly curved path to fit over spacer rings 35 and 36 attached to the tank side wall (see FIGS. 2 and 3). The panel may have edge portions that overlap as at 33a and 33b, and held in that condition by fasteners 37 and 38 protruding from the support rings. The shanks of the fasteners may be threaded to receive hold-down nuts 37a and 38a.

The panel 33 also contains openings 38–41 to closely pass or receive the legs, inserted through the panel and into the sockets 26, as at the job site.

The shell means includes at least one dome in alignment with a tank end wall and spaced therefrom. In the example, two such domes 44 and 45 are provided, respectively in alignment with tank end walls 12 and 13, and spaced therefrom, as at 46 and 47, adding to "greenhouse" heating effect. Note that sunlight from all directions may therefore pass through the shell structure 33, 44 and 45 to impinge on the tank walls 11, 12 and 13, for maximum heating efficiency. The domes may also be formed of plastic material (such as acrylic), and they have annular rims or rim portions 44a and 45a that are mounted telescopically to the annular ends of the shell side wall 33. Spacer rings 35 and 36 may be located to support the ends of the panel 33, as well as the rims of the domes, as shown. The attachment of the dome rims to the panel or side wall 33 ends may be further secured, as by adhesive bonding, using epoxide cement, for example.

Also shown are a cold water inlet duct 50 and an outlet duct 51. Both ducts open at the top of the tank and shell (see 50a and 51a); however duct 50 opens to the lower interior 52 of the tank at one end thereof, whereas duct 51 is elongated and opens at 51b to the upper interior 53 of the tank at the opposite end thereof. Sacrificial anode elements 56 and 57 are attached at 58 and 59 to the tank end wall 13, to extend lengthwise within the tank interior. An electrical heater element 60 extends in the tank interior, and is energizable to heat water therein, as a back-up heater means. An access plate 61 on the tank exterior supports a duct 62 for external electrical wiring 63 that connects to the heater element. Numeral 67 indicates a receptacle for a desicator 65 exposed to the space or zone between the tank wall and glazing shell structure, to absorb moisture and prevent fogging of the shell. The dome 45 may be removable, to provide access to the dessicant, for replacement.

The invention offers a highly efficient apparatus for collecting and storing solar energy, and which is easily transported and assembled at a job site. Also, the construction enables the ratio of thermal mass to heat loss coefficient (BTU/°F./hour) to be very high (over 36 hours) which greatly increases efficiency in terms of low heat loss.

The surface of the tank may be darkened, as by a nickel coating (product "MAXOR B" of International Nickel Co.) to reduce heat radiation losses, at night. The space between the glazing and tank may contain cellular or honeycomb material oriented to pass solar radiation therethrough, to further increase efficiency. See a portion of said material indicated at 69 in FIG. 5a. Typically, the steel tank may be at least about 5 feet long, and at least about 1½ to 2 feet in diameter, for optimum efficiency. If the tank contains for example 120 gallons of water, and up to 30 gallons of water are used in a day (as in dwellings) the tank water remains hot.

Space 34 may be filled with a transparent liquid or a gel which both suppresses convective and radioactive heat losses and, because of its index of refraction, acts to magnify the apparent size of the vessel to thereby increase its collection of thermal energy. One such liquid is glycerine, and one such gel is knox gelatine. Space 34 may alternatively be a vacuum.

Vessel 10 may alternatively be spherical; and the thermal radiation suppression means may consist of a coating on the interior surface of the glazing, which coating is transparent to solar radiation and reflective to thermal infrared radiation.

The advantages of this invention, are to be contrasted with the prior art of solar heating of fluids which generally falls into two major categories, depending whether the functions of solar energy collection and storage are separate or combined. Furthermore, both types generally employ planar transparent apertures for admission of solar energy to an absorbing means, so that they collect energy only when the sun is in the part of the sky which they are facing.

Separation of the functions of collection and storage allow the respective separate apparatus to be optimized without compromise, but entail disadvantages as well. The total apparatus is inherently more complex and expensive, and less reliable. In order to transfer the collected solar thermal energy to the storage means, the collection means must operate at a temperature above that of the storage, and hence have greater heat losses and less efficiency. Furthermore, the collection means needs time in the morning to warm up to the necessary operating temperature, thereby cutting down the hours of operation and allowing the warm-up heat to be lost at night.

Combining the functions of collection and storage allows considerable simplification of the apparatus, increasing its reliability and decreasing its expense. Such systems typically lose a large part of their stored solar heat in one night. Moreover, the sunlight entering the planar aperture must be directed onto the surface of the storage vessel. This is usually done with curved mirrors mounted on the back wall of a large box containing the storage vessel and having one wall transparent to admit sunlight. The box is much bigger than the vessel, giving rise to strong convection in the air inside it. Practical limitations on the box size give concomitant limits on the size of the storage vessel.

The present invention is of the combined type, in that it has a storage vessel to be directly heated by sunlight. An important difference from the prior art lies in the fact that the vessel is entirely surrounded by translucent walls, so that its entire external surface can receive solar radiation. There are several advantages to this feature. First, since at least 30% of sunlight is diffuse (coming from the entire sky), the vessel's light-gathering ability is enhanced. Second, instead of expensive mirrors, the apparatus can use the sunlight reflected from adjacent white-painted surfaces, which are much cheaper and more effective than mirrors. Third, spacing the transparent enclosure close to the storage vessel causes the convective heat losses to be much smaller than those of a vessel in a large box, both because of the smaller outer surface area for heat losses and because of the smaller volume of interior air giving weaker convective heat losses. Given practical constraints on the overall size of a solar heater, the apparatus of the invention can devote a much greater portion of its volume to it storage vessel, giving greater heat-storage capacity.

A second important advantage lies in the relation between storage capacity and heat losses. Whenever the storage temperature is above that of the surroundings, heat will be lost in proportion to that temperature difference. The proportionality constant is called the heat loss-coefficient, and can be measured in BTU per degree Fahrenheit per hour. When there is no sunlight to heat the storage vessel, a fixed proportion of its stored heat will be lost every hour. The thermal capacity, or thermal mass, of the storage vessel is the product of its mass and its specific heat. Since the specific heat of water is one, a vessel filled with 1000 pounds of water will have a thermal mass of 1000 BTU per degree Fahrenheit. When the heat-loss coefficient is divided into the thermal mass, the result is a characteristic time, during which the stored heat exponentially decays to $\frac{1}{3}$ (about 36%) of its original value. If this thermal decay time is 36 hours or more, then in a 12-hour night only 18% or less of the stored heat will be lost, assuring heat delivery in the morning.

There are several further advantages to a larger storage vessel than was customary in the prior art. In the case of solar water heating, the daily draw of hot water becomes a smaller portion of the storage capacity as the vessel is enlarged. The heat remaining the next day will augment the heat to be collected. Thus even in poor weather, several days heat can be accumulated in a large vessel having a long thermal decay time. Another advantage is that solar heat tends to be concentrated at the top of the storage vessel by convection currents within the enclosed liquid. This means that the uppermost portions of the enclosed liquid will heat up rapidly.

Another feature of the invention is the provision of substantially horizontal area at the top of the storage vessel, which would receive the greatest portion of the solar energy striking the vessel, further adding to the rapid heating of the top portions of the stored liquid.

A final feature is suppression of thermal radiation heat losses, which combine with the reduction in convective heat losses to give a low overall heat-loss coefficient and hence a long thermal decay time. This radiation suppression can be accomplished by suitable coatings either on the outer wall of the storage vessel or on the inner surface of the translucent enclosure. Another means is the use of translucent honeycomb, which suppresses radiation as well as convection.

This invention, because of its simplicity and effectiveness, can in mass production be made for about the same cost as conventional gas-fired and electric water heaters.

We claim:

1. In apparatus for collecting and absorbing solar radiant energy, for storing same, the combination comprising energy
   (a) metal tank which absorbs solar radiant and transfers heat to liquid in the tank, the tank having a side wall and a first end wall,
   (b) tank support means including leg structure projecting away from the tank for supporting same, and
   (c) translucent glazing shell means supported by the tank and having a side wall extending about and spaced from the tank side wall, the shell means including at least one dome in alignment with said tank end wall and spaced therefrom, said shell means adapted to pass radiant solar energy to impinge on the tank side wall and end wall,
   (d) said leg structure extending through at least one opening defined by the shell means.

2. In apparatus for collecting and absorbing solar radiant energy, for storing same, the combination comprising
   (a) a metal tank which absorbs solar radiant energy and transfers heat to liquid in the tank, the tank having a side wall and a first end wall,
   (b) tank support means including leg structure projecting away from the tank for supporting same, and
   (c) translucent glazing shell means supported by the tank and having a side wall extending about and spaced from the tank side wall, the shell means including at least one dome in alingment with said tank end wall and spaced therefrom, said shell means adapted to pass radiant solar energy to impinge on the tank side wall and end wall,
   (d) said leg structure extending through said shell side wall.

3. The combination of claim 2 wherein said support means includes skid means supporting said leg structure.

4. The combination of claim 3 wherein:
   (i) said leg structure includes multiple legs,
   (ii) said skid means includes skids supporting said legs and elongated in the direction of tank and shell side wall elongation.

5. The combination of claim 2 wherein said support means includes band means extending about the tank side wall within a zone defined between the shell side wall and tank side wall, the leg means attached to said band means within said zone.

6. The combination of claim 4 wherein
   (iii) said support means also includes two bands extending about the tank side wall within a zone defined between the shell side wall and the tank side wall,
   (iv) first and second of said legs attached to one band, and third and fourth of said legs attached to the other band,
   (v) the first and third legs attached to one skid, and the second and fourth legs attached to the other skid.

7. The combination of claim 4 wherein there are two of said skids spaced at substantially equal distances from the tank, there being pairs of said legs, the legs of each pair diverging downwardly and respectively connected with said two skids.

8. The combination of claim 4 wherein there are two of said skids, and pairs of said legs, the legs of said pairs respectively connected with the two skids, one leg of each such pair being shorter than the other leg of said pair so that one skid is located closer to said tank than the other skid, along the skid lengths, the skids extending in generally parallel relation.

9. The combination of claim 2 wherein the tank has a second end wall, the shell means including a second dome in alignment with said tank second end wall and spaced therefrom, said tank side wall having opposite annular end portions, the domes having annular rims extending in telescopic relation with said side wall annular end portions, respectively.

10. The combination of claim 2 including spacer means on the tank, the shell side wall supported on said spacer means, to pass said leg structures through openings in the shell side wall.

11. The combination of claim 1 including inlet and outlet ducts passing through the tank wall and said glazing shell means, and communicating with spaced apart tank interior regions.

12. The combination of claim 1 having a thermal mass to heat loss coefficient ratio of at least 24 hours.

13. In apparatus for integral collection and storage of solar thermal energy, the combination comprising
   (a) relatively large storage vessel having side and end walls that absorbs solar energy in order to heat its contents;
   (b) translucent enclosing means surrounding said large storage vessel, for suppression of convective heat losses; and wherein said transparent enclosing means consists of a single surrounding translucent surface which is substantially parallel to the exterior of said large storage vessel, and close enough to it so as to cause reduction in convective heat losses,
   (c) said apparatus having a ratio of thermal mass, as measured in BTU per degree Fahrenheit, to heat-loss coefficient, as measured in BTU per degree Fahrenheit per hour, exceeding 36 hours,
   (d) the space between the exterior of said large vessel and said translucent surface filled with a transparent liquid or gel which both suppresses convective and radiative heat losses and, because of its index of refraction, acts to magnify the apparent size of said vessel and thereby increase its collection of solar energy.

14. The combination of claim 13 wherein said large storage vessel has sufficient vertical extend for sunlight to cause thermal stratification whenever its contents are a liquid.

15. The combination of claim 13 wherein said large storage vessel has sufficient top area of substantially horizontal orientation to cause sunlight to rapidly heat up the uppermost contents of the vessel.

16. The combination of claim 13 wherein said transparent enclosing means consists of multiple surrounding translucent surfaces which are substantially parallel to the exterior of said large storage vessel, and spaced closely enough so as to cause reduction in convective heat losses.

17. In apparatus for integral collection and storage of solar thermal energy, the combination comprising
   (a) relatively large storage vessel having side and end walls that absorb solar energy in order to heat its contents;
   (b) translucent enclosing means surrounding said large storage vessel, for suppression of convective heat losses; said transparent enclosing means comprising a single surrounding translucent surface which is substantially parallel to the exterior of said large storage vessel, and close enough to it so as to cause reduction in convective heat losses, together with multiple transparent walls extending perpendicularly from the exterior of said large storage vessel to said transparent enclosing surface, and forming closed cells of sufficiently high aspect ratio for suppression of convection in the air within them, with said multiple walls having high solar transparency and high absorptance of thermal infrared radiation, so as to suppress thermal radiation heat losses from storage vessel,
   (c) said apparatus having a ratio of thermal mass, as measured in BTU per degree Fahrenheit, to heat-loss coefficient, as measured in BTU per degree Fahrenheit per hour, exceeding 36 hours.

18. The combination of claim 4 wherein the space between the exterior of said large storage vessel and said transparent surface is a vacuum.

19. The combination of claim 1 including thermal radiation suppression means which consists of a coating on the exterior of said tank which has high absorptance of solar radiation and low emittance of thermal infrared radiation.

20. The combination of claim 2 including thermal radiation suppression means which consists of a coating on the interior of said translucent shell means which is transparent of solar radiation and reflective to thermal infrared radiation.

21. The combination of claim 13 wherein said large storage vessel has an outwardly domed surface.

22. The combination of claim 1 wherein said tank is a vertically oriented cylinder.

23. The combination of claim 1 wherein said tank is a horizontally oriented cylinder.

24. The combination of claim 1 wherein an electrical backup heater is installed in said tank.

* * * * *